Figure 1:
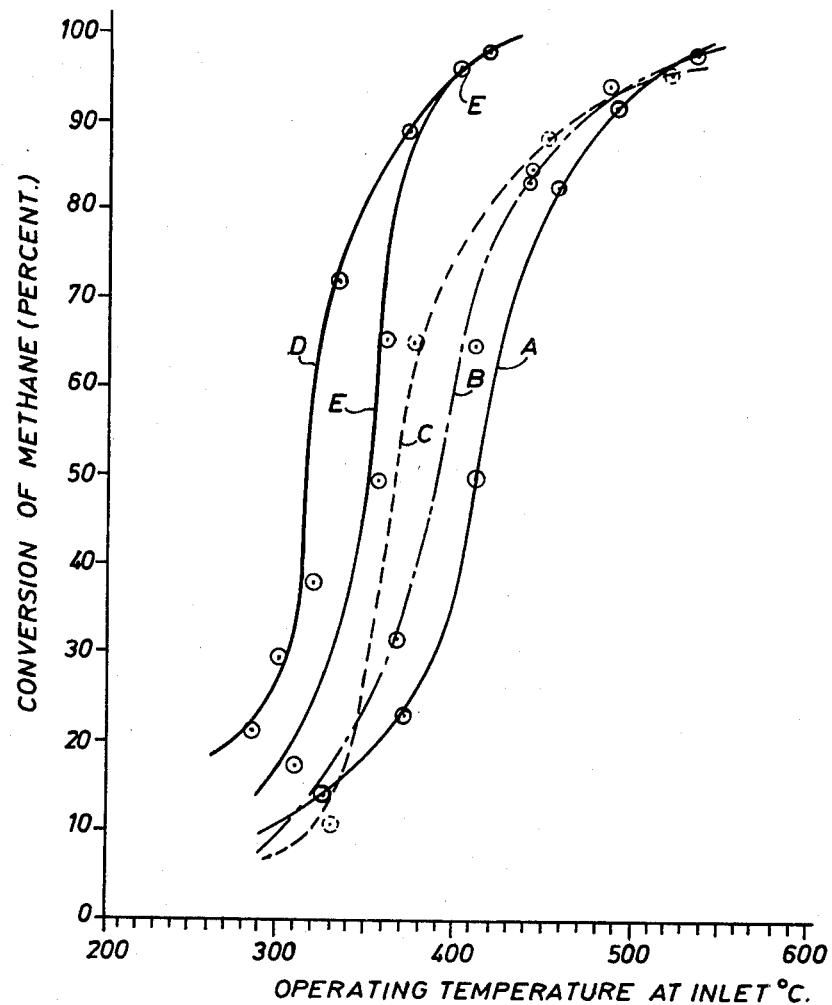

United States Patent [19]
Acres et al.

[11] 4,289,737
[45] * Sep. 15, 1981

[54] CATALYTIC REACTIONS

[75] Inventors: Gary J. K. Acres; Robert M. Hutchings, both of London, England

[73] Assignee: Johnson, Matthey & Co., Limited, London, England

[*] Notice: The portion of the term of this patent subsequent to Apr. 23, 1991, has been disclaimed.

[21] Appl. No.: 62,903

[22] Filed: Aug. 1, 1979

Related U.S. Application Data

[63] Continuation of Ser. No. 916,817, Jun. 16, 1978, abandoned, which is a continuation of Ser. No. 463,143, Apr. 22, 1974, abandoned, which is a continuation-in-part of Ser. No. 71,131, Sep. 10, 1970, abandoned.

[30] Foreign Application Priority Data

Sep. 16, 1969 [GB] United Kingdom ............... 45545/69

[51] Int. Cl.$^3$ ............................................. B01D 53/36
[52] U.S. Cl. .................................. 423/245; 423/213.5; 423/415 R
[58] Field of Search .................. 423/213.2, 213.5, 245, 423/247, 415; 252/466 PT

[56] References Cited

U.S. PATENT DOCUMENTS

| | | | |
|---|---|---|---|
| 3,259,453 | 7/1966 | Stiles | 423/213.5 |
| 3,554,929 | 1/1971 | Aarons | 423/213.5 X |
| 3,565,830 | 2/1971 | Keith et al. | 423/213.5 |
| 3,806,582 | 4/1974 | Acres et al. | 423/213.5 |

FOREIGN PATENT DOCUMENTS

| | | | |
|---|---|---|---|
| 566487 | 4/1968 | Belgium | 423/213.5 |
| 411655 | 6/1934 | United Kingdom | 423/213.5 |

Primary Examiner—G. O. Peters
Attorney, Agent, or Firm—Cushman, Darby & Cushman

[57] ABSTRACT

This specification describes a process and a catalyst for the removal of a gaseous carbon compound pollutant in the form of a gas containing the same by oxidation. The gas is passed through a catalyst bed in which the catalyst comprises a porous refractory support having a platinum group metal deposited thereon, said oxidation involving bringing said gas to its ignition temperature followed by combustion of said gas in the presence of said catalyst. In the process of the invention, the ignition temperature of the said gas is lowered to a temperature below 350° C. and the catalyst used consists eessentially of an inert rigid unitary porous refractory ceramic honeycomb having deposited upon the surfaces which come into contact with the said gas a first layer of a catalytically active high surface area refractory metal oxide, a major proportion of which is selected from oxides of at least one of the metals of Group II, III and IV of the Periodic Table having atomic numbers not exceeding 40, and a second metallic layer deposited upon said first layer consisting essentially of an alloy or mixture of rhodium and platinum metals wherein the rhodium content of the alloy or mixture is within the range 30–40 wt % of the total rhodium and platinum present.

1 Claim, 2 Drawing Figures

CATALYTIC REACTIONS

This is a continuation of application Ser. No. 916,817, filed June 16, 1978, now abandoned, which is a continuation of Ser. No. 463,143, filed Apr. 22, 1974, now abandoned which is a continuation-in-part of Ser. No. 71,131, filed Sept. 10, 1970, now abandoned.

This invention relates to a process for the catalytic removal of a gaseous carbon compound from a gas containing the same and to catalysts for use in such a process. The process is particularly applicable to the vapour phase oxidation of organic compounds, such as the lower hydrocarbons, for example, methane and ethane as well as the removal of a gaseous carbon compound pollutant from an exhaust gas of an internal combustion engine.

Methane is at the present time, as a result of its relative cheapness and its presence in natural gas from the North Sea and other areas, coming into increasing prominence as a reducing fuel. It may be oxidised in a number of industrially important processes.

Unburnt hydrocarbons and carbon monoxide in internal combustion engine exhausts and a wide variety of other organic compounds, produced by well established processes in the chemical industry, present serious problems of atmospheric contamination. Effluents produced include those from engines, industrial paint baking ovens, printing presses, wire enamelling and solvent cleaning operations, solvent storage tanks and from chemical reactions such as the manufacture of ethylene and ethylene oxide to mention but a few examples.

The oxide of nitrogen which is present in diesel exhaust gases is mainly nitric oxide. This is produced during the combustion of diesel fuel by the combinations of nitrogen and oxygen at the high temperatures and pressures present in a combustion chamber. The presence of nitric oxide in the exhaust gases is particularly hazardous when the engine is used in a confined space.

Any engine operating parameter that reduces the combustion temperature will reduce the nitric oxide concentration. For example, retarding the engine, increasing the fuel concentration, reducing the compression ratio reducing the maximum power output of the engine, and recycling the exhaust gases all lead to a reduction in nitric oxide levels.

Unfortunately, a number of these modifications which reduce nitric oxide levels also increase the CO and hydrocarbon content of the exhaust gases and, therefore, cannot be used without an exhaust gas purification unit.

Catalytic combustion is a well established procedure for the elimination of many of the components present in the exhaust from a diesel engine. The catalytic system works by promoting the combustion of the carbon monoxide, hydrocarbons aldehydes, etc., that are present in the exhaust gases with oxygen. The products of this reaction are carbon dioxide and water, which of course, are odourless and non-toxic. Unlike the petrol engine, there may be up to 20% excess air in the exhaust gases of diesel engines, and this will provide adequate oxygen for the combustion reaction. All that necessary, therefore, for catalytic diesel exhaust purification is the installation of a catalyst chamber into the exhaust system from the engine.

As the catalytic combustion reactions are more effective the higher the exhaust temperatures, it is preferable for the catalytic unit to be installed as close to the exhaust manifold as is practical.

Generally speaking, with catalytic oxidation the reaction takes place at a much lower temperature than that required by direct combustion technique and, because it is a surface reaction, is less influenced by the concentration of the reactants.

For safety reasons the concentration of combustible fume in plant air streams does not exceed 25% of the lower explosion limit and cannot therefore be ignited. The fume concentrations encountered in air pollution problems may range from 1 to 1000 ppm and for combustion to take place, the fume laden air must be raised to the autogenous ignition temperature. This temperature will depend upon the chemical composition of the fume. It is rarely below 500° C. and may be as high as 1000° C. for complete combustion.

The cost of the fuel required to achieve these temperatures is more often than not prohibitive and in some cases may be higher than the operating cost of the process generating the fume. Therefore, although combustion is an attractive method of destroying organic pollutants because it is continuous and produces no effluent, a means of reducing the reaction temperature is required to make the process more economic.

Hydrocarbons such as methane and ethane and other organic component emitted in the exhausts of diesel engines under medium or high load conditions require relatively high catalyst temperatures before reaction occurs. Thus, if a catalyst could be made which was active for methane and the lower hydrocarbons at substantially lower reaction temperatures it would constitute a substantial advance over the existing processes. The catalyst itself, must however still have reasonably high (750°-800° C.) temperature stability. Equivalent problems are associated with the use of natural gas (which is mostly methane but includes a certain amount of $H_2$).

Important advantages of low ignition temperature are:

(a) better fuel conversion efficiency and lower running costs (that is, in those cases where the organic effluent is being used as a fuel), (b) a higher percentage removal of noxious gases escaping into the atmosphere;

(c) smaller heat exchangers and a cheaper reactor system may be used, and (d) it makes possible the use of a single catalyst bed instead of a dual or other more complicated system.

It is an object of this invention to provide a process whereby ignition of organic contaminants may take place at a low temperature, thus enabling them to be more completely removed from an effluent gas escaping into the atmosphere.

Air pollution control by catalytic combustion imposes a number of restrictions on the type of catalyst which may be used. In addition to a requirement that the catalyst should be active at low temperatures, it must also be stable under both oxidising and reducing conditions. The catalyst when packed into a reactor should have a very low pressure drop across the bed and it should be resistant to attrition, thermal shock and clogging by dust particles.

Up to the present time platinum has been the preferred catalyst for air pollution control. In the conventionally supported form platinum is more active than the best of the base metal catalysts, it is stable up to at least 750° C. and is resistant to poisoning by most elements except lead and phosphorus.

Supported platinum has been used, as have base metal catalysts, in pelleted form but pressure drop problems through the catalyst bed and attrition between the individual catalyst pellets impose severe limitations on the design of the catalyst reactor.

The concentration of organic compounds in the fume is also important. In most cases, the concentration does not significantly affect the ignition temperature. A notable exception however is methane. The concentration of the fume and its composition does, however, determine the amount of oxygen that will be consumed and the temperature rise that will occur on the catalyst. This may be calculated and used in the design of the abatement plant. Where it is significant, the heat generated may be used to sustain the oxidation or recycled to maintain the temperature of the process gas.

The temperature of the gas stream containing the fume to a large extent determines the design of the plant required for pollution control. When the temperature is above that required for ignition, the catalyst may be placed directly in the gas stream. Examples of this use are wire-enamelling ovens, some paint-drying ovens, self-cleaning cookers and diesel or internal combustion engine exhaust systems.

In U.S. Pat. No. 2,980,743, there is described and claimed a specific process for the selective oxidation of carbon monoxide in admixture with ethylene using a catalyst system containing alloys of platinum and rhodium. In this patent reference is made to a catalyst containing 80 wt% platinum and 20 wt% rhodium but, in contrast with the U.S. Patent, the catalyst of the present invention is directed to a supported catalyst system containing a layer of 30–40 wt% rhodium deposited on a layer of a refractory metal oxide carried by an inert rigid porous refractory ceramic honeycomb structure.

The catalyst of the present invention has the advantage of lowering the ignition temperature of the gas to be operated upon and, according to the present invention there is provided, in a process for the removal of a gaseous carbon compound pollutant from a gas containing the same by oxidation wherein said gas is passed with oxygen through a catalyst bed in which the catalyst comprises a porous refractory support having a platinum group metal deposited thereon, said oxidation involving bringing said gas to its ignition temperature followed by combustion of said gas in the presence of said catalyst, the improvement whereby ignition temperature of said gas is lowered to a temperature below 350° C., said improvement comprising utilizing, as the catalyst, one which consists essentially of an inert rigid unitary porous refractory ceramic honeycomb having deposited upon the surfaces which come into contact with the said gas a first layer of a catalytically active high surface area refractory metal oxide, a major proportion of which is selected from the oxides of at least one of the metals of Group II, III and IV of the Periodic Table having atomic numbers not exceeding 40, and a second metallic layer deposited upon said first layer consisting essentially of an alloy or mixture of rhodium and platinum metals wherein the rhodium content of the alloy or mixture is within the range 30–40 wt% of the total rhodium and platinum present.

The present invention also includes a catalyst for use in the removal of a gaseous carbon compound pollutant from a gas containing the same comprising an inert rigid unitary porous refractory ceramic honeycomb having deposited upon the surfaces which come into contact with the said gas a first layer of a catalytically active high surface area refractory metal oxide, a major proportion of which is selected from oxides of at least one of the metals of Group II, III and IV of the Periodic Table having atomic numbers not exceeding 40, and a second metallic layer deposited upon said first layer consisting essentially of an alloy or mixture of rhodium and platinum metals wherein the rhodium content of the alloy or mixture is within the range 30–40 wt% of the total rhodium and platinum present.

The inert rigid porous refractory honeycomb structure may be made of a ceramic material. Suitable ceramic materials are zircon-mullite, mullite, alpha alumina, sillimanite, magnesium silicates, zircon, petalite, spodumene, cordierite, and aluminosilicates. A suitable proprietary product is "Torvex" (Registered Trade Mark) sold by E. I. Du Pont de Nemours & Co. Either so-called "straight through" or "cross-flow" "Torvex" may be used.

The following characteristics have been found to be suitable in the working of the invention, but are not, of course, obligatory for successful operation of the process.

The inert structure, used in the process of the present invention, onto which the refractory metal oxide is deposited is an inert unitary rigid honeycomb structure or a block having a plurality of openings or channels therethrough in the direction of gas flow. The structure will usually occupy nearly all the cross-sectional area of the reaction zone, with packing between the structure and the reactor walls so as to prevent any part of the gas stream by-passing the structure. For large cross-sectional areas, say six inches, or more, it is convenient to provide a regularly arranged array of closely fitting blocks. Also it may be desirable for more complete purification to provide sequential or serial block positioning. In this latter case, and if desired, the low back pressure may be further reduced between layers of blocks by shallow parallel grooves at an end of a block to enlarge connections between channels. Advantageously, the unitary structure is shaped to fit and, preferably, closely fit, the reaction zone or reactor into which it is to be disposed. Blocks of appropriately shaped honeycomb materials to support the catalyst are placed in the reactor so that the general direction of the cellular gas flow channels is in line with the gas flow through the reactor. Alternatively, the blocks may be disposed so that gas flow through the reactor is radial or transverse to the general or overall gas flow.

The structure support is constructed of a substantially chemically inert, rigid, solid porous refractory material capable of maintaining its shape and strength at high temperatures, for instance up to 1100° C. or more. The refractory material should preferably have a bulk density of from 0.45 to 1.05 grams per cubic centimeter, (from 0.5 to 0.9 grams per cubic centimeter is more suitable) and be unglazed. The accessible pore volume not including the volume of gas flow channels is preferably greater than 0.10 cubic centimeter per gram of structure, more preferably between 0.20 and 0.30 cc/g.

The walls of the channels of the unitary support structure of this invention contain macropores in communication with the channels to provide increased accessible catalyst surface, and an absence of large numbers of small pores for high temperature stability and strength. Whereas the superficial surface area of such structures may be from 0.001 to 0.01 $m^2/g$ including the channels, the total surface area is typically hundreds of times greater, so that much of the catalytic reaction will take place in the large pores. The structure preferably has a macropore distribution such that over 95% of the pore volume is in pores having a size, i.e. diameter, greater than 2000 Angstrom units, and over 5% of the pore volume preferably is in pores having a size of over 20,000 Å. In a preferred embodiment over 50% of the pore volume is in pores of sizes of over 20,000 Å.

The superficial surface area of the carrier including the walls of the gas flow channels should be as large as is consistent with an acceptable back pressure in the gas flow system. The superficial surface area will often be from 0.5 to 6, preferably from 1 to 2.5, square meters per liter of support. Thus, the channels through the unitary structure can be of any shape and size consistent with the desired superficial surface and should be large enough to permit free passage of the contaminant containing gas to be purified and to prevent plugging by any solid matter entrained by the gas. In one embodiment, the channels are generally parallel and extend through the support from one side to an opposite side, and preferably such openings are separated from one another by thin walls defining the openings. In another embodiment, a network of channels permeates the body. The channels are unobstructed or substantially unobstructed to the gas flow. For most efficient operation, the channel inlet openings are distributed across essentially the entire face or cross-section of the support subject to initial contact with the gas to be reacted. The preferred structure supports of this invention are of mullite of zircon-mullite characterised by having good thermal shock resistance because of its low coefficient of thermal expansion, although other similar chemically inert refractory crystalline ceramic materials can also be employed. Examples of other refractory materials suitably as a support or carrier are, for instance, alpha-alumina, sillimanite, magnesium silicates, zircon, petalite, spodumene, cordierite, alumino-silicates, etc.

Unlike a pellet catalyst bed which must be vertical with downward gas flow, there is no restriction on either the position of a ceramic honeycomb catalyst or the direction of the gas flow through a reactor containing it. Ceramic honeycombs have a high surface-to-volume ratio and therefore when supporting catalytic metals produce catalysts which are more active than pelleted catalysts. Because of their open structure the pressure drop across a ceramic honeycomb catalyst bed is only 1/20 of that across a pellet bed of similar dimensions. Honeycomb supports also have high thermal shock resistance and structural strength and have the great advantage of being attrition resistant.

The refractory metal oxide is deposited on the support (either continuously or discontinuously) and preferably the deposit is in the form of a film of from 0.0004 to 0.001 inches thick.

Such an oxide is a calcined refractory metal oxide which itself is characterised by a porous structure and which possesses a large internal pore volume and total surface area and is therefore referred to as an "active" (i.e. catalytically active) refractory metal oxide.

The preferred active refractory metal oxides contain members of the gamma or activated alumina family which can be prepared, for instance, by precipitating a hydrous alumina gel and, thereafter, drying and calcining to expel hydrated water and provide the active gamma-alumina. A particularly preferred active refractory metal oxide is obtained by drying and calcining at temperatures of 300° C. to 800° C. a precursor mixture of hydrous alumina phases predominating in crystalline trihydrate, that is, containing in excess of 50% by weight of the total alumina hydrate composition, preferably from 65% to 95% by weight of one or more of the trihydrate forms gibbsite, bayerite and nordstrandite by X-ray diffraction.

Other suitable active refractory metal oxides include for example active or calcined beryllia, zirconia, magnesia or silica, and combination of metal oxides such as boria-alumina or silica-alumina. Preferably the active refractory oxide is composed predominantly of oxides of one or more metals of Groups II, III and IV of the Periodic Table having atomic numbers not exceeding 40. The active refractory metal oxide deposit may constitute from 1 to 50 weight percent of the unitary support, preferably from 5 to 30 percent.

Providing the support with a deposit of the active refractory metal oxide of the present invention may be deposited on the support in several ways. One method involves dipping the support into a solution of the salt of the refractory metal and calcining to decompose the salt to the oxide form. Another and preferred method comprises dipping the support into an aqueous suspension, dispersion or slurry of the refractory oxide itself, drying and calcining. In this method, suspensions or dispersions having a solids content of from 10% to 70% by weight can be used to deposit a suitable amount of a refractory metal oxide on the support in a single application. In order to prepare a catalyst having 10% by weight of activated alumina on a zircon-mullite structure, from 20 to 40% by weight of solids is used in the suspension. The percentage of the solids present is determined on an ignited weight basis (ignited at 1100° C.). A particularly preferred method involves forming an aqueous dispersion or slurry as just described and subjecting the mixtures to a wet grinding or milling operation whereby the refractory metal oxide is reduced to a finely divided form and a thixotropic slip obtained, having the desired consistency, e.g. a solids content of 10% to 70% by weight. The support is then dipped into the slip, dried and calcined. In general, calcining temperatures of from 150° C. to 800° C. are employed. The calcination is favourably conducted in air, for example flowing dried air, or may be carried out in contact with other gases such as oxygen, nitrogen, or flue gas, or under vacuum conditions. The refractory oxide is deposited on the surfaces of the structure including the channel surfaces and superficial macropores in communication with the channel surfaces as thin deposits in a weight ratio of from 1% to 50% and preferably from 5% to 30% relative to the weight of the block.

The structure support may be wetted prior to applying the refractory metal oxide. In one embodiment, a zircon-mullite structure is immersed in an aqueous suspension containing the desired weight concentration of hydrated refractory oxide. The structure, because of its porosity, has been found to absorb the suspension readily. The catalyst structure is then dried and calcined at a temperature of from 400° C. to 800° C. and preferably of from 450° C. to 550° C. A ⅛ cubic foot zircon-mullite block absorbs roughly from 0.25 to 1 liter of the suspension.

The supported catalyst made in accordance with the method of this invention has a refractory oxide deposited on the inert ceramic structure and a catalytcially active metal impregnated on the refractory oxide.

Impregnation with the mixture or alloy of platinum and rhodium may be accomplished by known methods of deposition of catalytically active metals on supports.

For example the ceramic honeycomb structure, with activated alumina deposited thereon, may be immersed in a solution of a water-soluble inorganic salt or salts of the platinum and rhodium such as chloroplatinic acid and rhodium trichloride, agitating the mixture to ensure uniform distribution, and precipitating the metals by chemical or thermal reduction or by precipitating them in a chemically combined state on the catalyst structure. The metal is activated by conventional techniques.

After impregnation with platinum and rhodium, the catalyst may advantageously be contacted with hydrogen sulfide to fix the Pt-Rh alloy or mixture in the active refractory oxide film as a sulfide and give a more active and suitable catalyst with good dispersion of the Pt-Rh metals in a form preventing migration of the metal during drying and calcination. Alternatively, an aqueous solution of platinum and rhodium compounds may be reacted with hydrogen sulfide to form a sol, and this sol applied to the film of active refractory metal oxide. Following these treatments the completed catalyst can be calcined within the range of 150° C. to 800° C. and under conditions as previously disclosed.

It is desirable the final catalyst has the refractory metal oxide film in the activated or calcined state. Activation of the refractory metal oxide film may be carried out prior to depositing it on the support or subsequent thereto and even after the Pt and Rh impregnation step. Usually, such material is calcined or partially calcined before placement on the carrier and also after such placement and before deposition of the platinum group metal component. The catalyst containing the Pt-Rh metal mixture may be reduced as by contact with molecular hydrogen at elevated temperatures before, during or after calcination.

The amount of platinum and rhodium necessary will vary depending on the particular ratio selected. In all instances, however, the amount of platinum and rhodium compound added will be that sufficient to provide a small but catalytically effective amount of the metal in the final catalyst to catalyse the removal of the contaminant from the gas. In general, the total amount of platinum and rhodium is such that the rhodium content of the mixture or alloy is within the range of 30–40 wt% of the total rhodium and platinum present in the catalyst.

Suitable concentrations, which we have found to be satisfactory, are 0.9% w/w and 1.8% w/w.

EXAMPLE 1

A catalyst was used consisting of a 35% Rh 65% Pt alloy deposited on "Torvex" (the trade name of a proprietary product sold by E. I. De Pont de Nemours & Co. Inc.)

Torvex is an inert rigid refractory honeycomb structure made of the ceramic "Mullite". It has a first coating of a refractory metal oxide consisting of active alumina. The 35% Rh 65% Pt alloy is deposited by one of the known techniques.

Using this catalyst ignition temperatures for a wide range of organic molecules often encountered in polluted air were determined. Results are shown in Table 1.

TABLE 1.

Ignition Temperatures on 35% Rh/Pt on Torvex Catalyst for Molecules encountered in Polluted Air.

| | Ignition Temperature °C. | Inlet temperature for 90% conversion °C. |
|---|---|---|
| Hydrogen | 20 | 20 |
| Carbon monoxide | 150 | 150–200 |
| Benzene | 180 | 250–300 |
| Toluene | 170 | 250–300 |
| Xylene | 200 | 250–300 |
| Alpha pinene | 190 | 250–300 |
| Mesityl oxide | 180 | 250–300 |
| Ethanol | 160 | 250–300 |
| n heptane | 160 | 250–300 |
| Methyl isobutyl ketone | 175 | 300–350 |
| Methyl ethyl ketone | 175 | 300–350 |
| Dimethylformamide | 200 | 350–400 |
| Ethyl acetate | 275 | 400–450 |
| Methane (air) | 300 | 400–450 |
| Methane (3% $O_2/N_2$) | 325 | 400–450 |
| Thiophen | 335 | 400–450 |
| Pyridine | 407 | 400–450 |
| Chlorobutane | 425 | 450–500 |
| Hydrogen sulphide | 400 | 400–425 |
| Carbon disulphide | 350 | 375–400 |

The second column gives the temperature of the gas stream inlet to the catalyst bed which we have found to be necessary for 90% conversion of the contaminant in question. These temperatures are appreciably lower than the temperatures usually quoted for catalytic oxidation of these compounds.

EXAMPLE 2

Using the same catalyst as described in Example 1 (but with different ratios of Rh:Pt), the ignition temperature of 1.5% w/w methane in a 3% w/w oxygen containing gas in which the balance was nitrogen (with small quantities of oxides of nitrogen and the rare gases such as argon) ws determined. The determination was carried out for a range of Rh/Pt from 0 Rh–100 Pt to 100 Rh–0 Pt.

Results were as follows:

| Rh:Pt ratio | Ignition temperature °C. |
|---|---|
| 0:100 | 425 |
| 5:95 | 410 |
| 20:80 | 330 |
| 35:65 | 315 |
| 50:50 | 325 |
| 100:0 | 400 |

The results clearly indicate that the lowest ignition temperature range, and therefore the greatest efficiency in the removal of contaminants is for Rh-Pt ratios from 20:80 to 50:50 with the optimum appearing at from 30:70 to 40:60 and with a peak value at approximately 35 weight % Rh-Pt.

EXAMPLE 3

As a result of a series of experiments, graphs were drawn showing the conversion of methane plotted against the operating temperature at the inlet of a container housing a bed of catalyst and through which nitrogen gas containing 1.5 w% w/w methane and 3% w/w oxygen was passed. The catalyst was in the form of 0.125 inch diameter alumina pellets impregnated respectively with 0.3 wt% of platinum metal and with 0.3 wt% of rhodium platinum alloys containing different amounts of rhodium. Five batches of such a catalyst in pellet form were used and the metal or the composition of the alloy with which the relevant batches of pellets were impregnated are designated A to E below.

| BATCH | Rh wt.% | Pt wt.% |
|---|---|---|
| A | 0 | 100 |
| B | 5 | 95 |
| C | 20 | 80 |
| D | 35 | 65 |
| E | 50 | 50 |

For each of the five batches A to E, the percentage conversion of methane to carbon dioxide and water was determined at a number of values of the inlet temperature of the catalyst bed. These results are represented graphically and designated A to E in FIG. 1.

The ignition temperature, that is, the temperature at which the conversion of the methane became a self-sustaining reaction and at which the percentage conversion began to rise rapidly, was estimated by inspection of each of the lines A to E in FIG. 1. The results obtained are listed below and these values of ignition temperature and the corresponding values of rhodium content for the catalysts concerned were plotted to give the solid line in FIG. 2.

|   | Estimated Ignition Temp. °C. |
|---|---|
| A | 400 |
| B | 370 |
| C | 340 |
| D | 315 |
| E | 340 |

Figure 2:
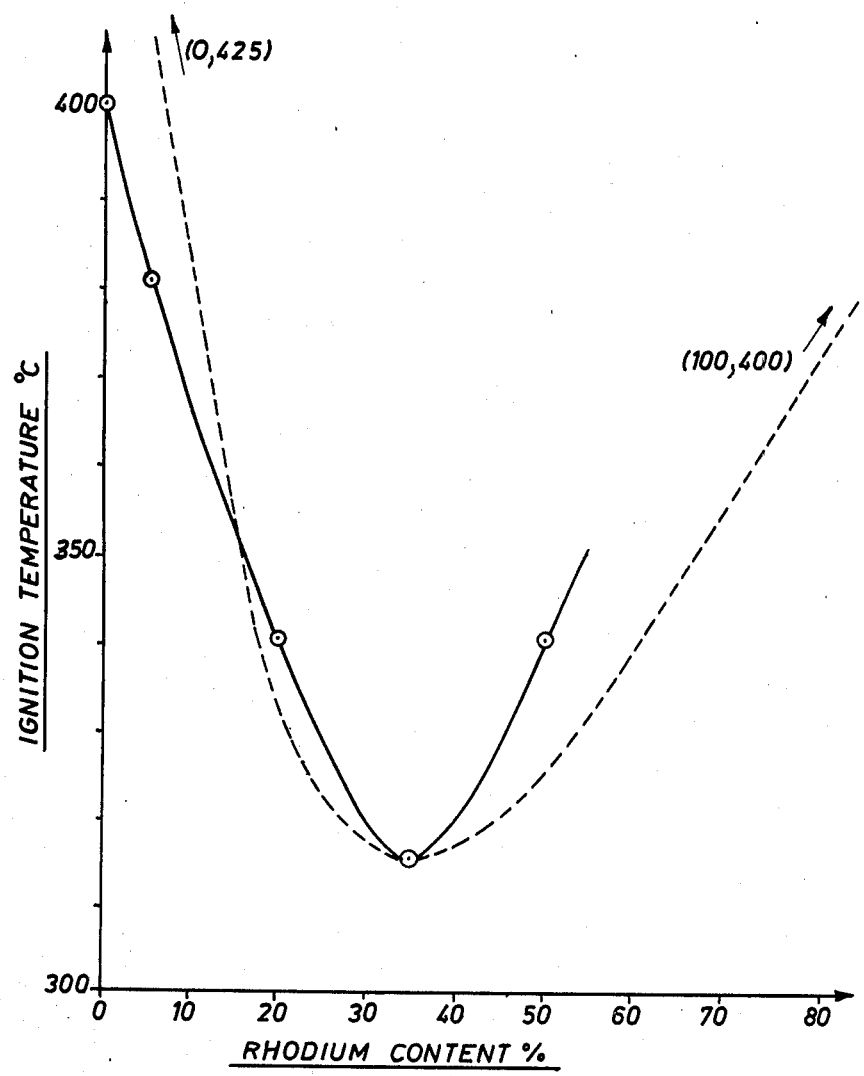

Finally, the corresponding values of ignition temperature and rhodium content given in the table included under Example 2 above for catalyst material supported on Torvex were plotted in FIG. 2 to give the broken line.

The two curves of FIG. 2 show a clearly defined minimum ignition temperature of 315° C. for a rhodium content of the catalyst alloy of 35%. Further, there is a relatively small rise in the ignition temperature on either side of the minimum up to rhodium contents of about 30 wt% and 40 wt%.

It will be observed that the Torvex supported catalyst gives a flatter curve at the minimum than the pelleted catalyst. This means that, for values of rhodium content a few percentages on either side of the minimum, the Torvex catalyst will "light off" rather more readily than the pelleted one.

EXAMPLE 4

Internal Combustion Engine Exhaust Purification

The concentration of pollutants varies from engine to engine and also depends upon the operating mode of the engine. For comparison purposes, figures typical of the two engine systems are given in Table 1.

TABLE I.

Maximum Emission Concentrations in Exhaust Gases from Petrol and Diesel Engines.

|   | Carbon Monoxide % | Hydrocarbons p.p.m. | Nitric Oxide p.p.m. | Sulphur Dioxide p.p.m. | Particulates g/m² |
|---|---|---|---|---|---|
| Diesel Engine | 0.1 | 300 | 4,000 | 200 | 0.5 |
| Petrol Engine | 10 | 1,000 | 4,000 | 60 | 0.01 |

Tests were carried out on a single cylinder Gardner IL2 laboratory engine fitted with a water brake and set up to reproduce exhaust gases typical of those emitted by diesel engines operating in enclosed areas. The operating characteristics of the engine are given in Table II.

TABLE II.

Operating Characteristics of the Test Engine.

| Conditions | Brake Horse power | Fuel Rate lb/h | Air rate lb/h | Speed rev/min. | Exhaust gas temperature °C. |
|---|---|---|---|---|---|
| Idling | — | 0.51 | 74.8 | 600 | 96 |
| Medium load | 7.5 | 5.14 | 119.0 | 1,190 | 487 |
| High load | 11.0 | 6.20 | 116.0 | 1,170 | 597 |

The catalytic combustion unit according to the present invention used in these tests was connected to the exhaust manifold by a short length of stainless steel tube. After passing through the catalyst unit, the exhaust gases were emitted to the atmosphere through a conventional silencer. The pressure drop in the catalyst unit was 0.4 inches of water.

Exhaust emissions and aliphatic aldehyde concentrations before and after the catalyst were measured by conventional techniques. Carbon monoxide and nitric oxide were determined by infra-red analysis. The hydrocarbon concentrations were determined by gas chromatography from samples collected in Haldane tubes. Smoke concentrations in the exhaust gases were obtained with a Hartridge Smokemeter.

Tests were made of the effectiveness of the catalyst for exhaust gas purification under three operating conditions—idling, medium and high load. Measurements and samples were taken before and after the catalyst and were taken 10 times for each engine condition. These tests were randomised and a period of 15 minutes was allowed between tests for the engine conditions to stabilise. The results of these tests are given in Table III.

In addition to the exhaust emissions listed in these tables, the aliphatic aldehyde content and odour of the exhaust gases were also determined. Under supposedly stable engine conditions, the aldehyde concentration in the exhaust gases was found to vary and as a result, the catalytic effectiveness for aldehyde removal was only measured under full load conditions. By taking samples simultaneously before and after the catalyst the aldehyde concentration was found to be reduced by 60 percent. The percentage variation for 95 percent confidence limits is 41.3 to 78.5 percent. The odour of the exhaust gases after the catalyst was significantly improved.

Using idling conditions, the exhaust gas temperature of 95° C. is too low for the catalytic reaction to occur. The effect of exhaust gas temperature on the removal of carbon monoxide by the catalyst (35% Rh/Pt on a rigid porous refractory honeycomb structure) was determined and is shown graphically in the accompanying FIG. 1. The results show that the catalyst becomes effective at 170° C. and its activity increased rapidly with increasing exhaust temperature.

TABLE III.

| Compound | Without catalyst p.p.m. by vol. | With catalyst p.p.m. by vol. | Variation % | Percentage variation for 95% confidence limit. |
|---|---|---|---|---|
| A Summary of Exhaust Emissions at Idling (Mean of ten tests). | | | | |
| Oxides of nitrogen | less than 500 | less than 500 | — | not significant |
| Ethane | 15.3 | 17.0 | 11.10 | not significant |
| Methane | — | — | — | not significant |
| Carbon monoxide | 1,032 | 1,014 | 0.17 | not significant |
| Smoke | 3.9* | 4.0* | 2.56 | not significant |
| B Summary of Exhaust Emissions at Medium Load (Mean of ten tests). | | | | |
| Oxides of nitrogen | 2,270 | 2,125 | 6.4 | not significant |
| Ethane | 8.0 | 1.6 | 80.0 | 67.4–88.2 |
| Methane | — | 0- | — | — |
| Carbon monoxide | 474 | 97 | 79.5 | 78.5–80.5 |
| Smoke | 12.9* | 13.1* | 1.6 | not significant |
| C Summary of Exhaust Emissions at High Load (Mean of ten tests). | | | | |
| Oxides of nitrogen | 2,097 | 2,281 | 8.8 | not significant |
| Ethane | 8.0 | 2.4 | 70.0 | 50.5–89.6 |
| Methane | 15.6 | 11.8 | 24.4 | 5.5–43.2 |
| Carbon monoxide | 1,930 | 320 | 83.4 | 82.7–84.0 |
| Smoke | 41.3* | 36.7* | 11.1 | not significant |

*Smoke expressed in Hartridge smoke units.

The degree of exhaust purification, which is expressed as a percentage variation in these tables, may be increased up to a theoretical value of 100 percent by increasing the volume of catalyst used in the combustion unit. Increasing the volume of catalyst would also give a significant variation in the smoke concentration before and after the catalyst, but at this stage of catalyst development this would not be economical in a commercial system. Although the catalyst is less effective at reducing smoke than it is at reducing other exhaust emissions the catalyst does not become coated with smoke particles and therefore rendered ineffective. The smoke particles on the catalyst are continuously removed by catalytic oxidation during the operating life of the catalyst.

EXAMPLE 5

Using 1.5% methane or natural gas injected into a fuel into a nitric acid manufacture tail gas containing typical quantities of NO, $NO_2$, $N_2O$, 3% $O_2$ and balance inert constituents such as $N_2$ and Ar at atmospheric pressure and a space velocity of 100,000 $hr^{-1}$, the following ignition temperatures were achieved for the catalysts shown:

| | Ignition temperature |
|---|---|
| Pd/ceramic honeycomb | 275–300° C. |
| Pt/Torvex | 425–450° C. |
| 35% Rh 65% Pt on Torvex | 300–325° C. |

The total metal concentration of the 35% Rh 65% Pt catalyst was 120g per cu. ft. of catalyst (or approximately 0.9% w/w).

Pt/Rh catalysts according to the present invention may be expected to have an active life of at least 2½ years. While the Pd on ceramic honeycomb catalyst exhibits acceptable ignition temperatures, it has been found unstable at these temperatures of operation and has been known to fail in one month.

The results thus indicate that 35% Rh 65% Pt catalysts according to the present invention combine a usefully low ignition temperature with good stability under oxidising conditions at elevated temperatures.

EXAMPLE 6

Using 1.78% by volume methane of natural gas injected into a nitric acid plant tail gas at 75 lbs. per square inch (p.s.i.) pressure which also contained 3% by volume oxygen and 2000 ppm oxides of nitrogen, the following results were obtained with 35% Rh 65% Pt on mullite ("Torvex"):

| | |
|---|---|
| Ignition temperature: | 325° C. |
| Methane conversion efficiency: | Greater than 90% |
| Stability of catalyst: | Good. |

What is claimed is:

1. In a process for the removal of methane from a gas containing the same, by oxidation to carbon dioxide and water wherein said gas is passed with oxygen through a catalyst bed in which the catalyst comprises a porous refractory support having a platinum group metal deposited thereon, said oxidation involving bringing said gas to its ignition temperature followed by combustion of said gas in the presence of said catalyst, the improvement comprising utilizing, as the catalyst, one which consists essentially of an inert rigid unitary porous refractory ceramic honeycomb having deposited upon the surfaces which come into contact with the said gas a first layer of a catalytically active high surface area refractory metal oxide, a major proportion of which is selected from oxides of at least one of the metals of Group II, III and IV of the Periodic Table having atomic numbers not exceeding 40, and a second metallic layer deposited upon said first layer consisting essentially of an alloy of 35% by weight rhodium and 65% by weight platinum whereby the ignition temperature of the gas is reduced when compared with otherwise identical catalysts wherein the second metallic layer is (a) 100% platinum, (b) 100% rhodium or (c) alloys of 5% rhodium and 95% platinum; 20% rhodium and 80% platinum; or 50% rhodium and 50% platinum, the reduced temperature being in the range of 300°–325° C.

* * * * *